US012686056B2

(12) United States Patent
De Pena Hempel et al.

(10) Patent No.: US 12,686,056 B2
(45) Date of Patent: Jul. 21, 2026

(54) PART PACKING WITH DIFFUSION AURAS

(71) Applicant: Peridot Print LLC, Palo Alto, CA (US)

(72) Inventors: Alejandro Manuel De Pena Hempel, Sant Cugat del Valles (ES); Jun Zeng, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 995 days.

(21) Appl. No.: 17/299,663

(22) PCT Filed: Jan. 28, 2019

(86) PCT No.: PCT/US2019/015417
§ 371 (c)(1),
(2) Date: Jun. 3, 2021

(87) PCT Pub. No.: WO2020/159469
PCT Pub. Date: Aug. 6, 2020

(65) Prior Publication Data
US 2022/0040925 A1     Feb. 10, 2022

(51) Int. Cl.
*G06F 30/00*     (2020.01)
*B22F 10/80*     (2021.01)
(Continued)

(52) U.S. Cl.
CPC ............ *B22F 10/80* (2021.01); *B29C 64/386* (2017.08); *B33Y 50/00* (2014.12); *G06F 30/00* (2020.01);
(Continued)

(58) Field of Classification Search
CPC ........ B29C 64/386; B22F 10/80; B22F 10/28; B33Y 50/00; B33Y 30/00; G06F 30/00;
(Continued)

(56) References Cited

U.S. PATENT DOCUMENTS

| | | | |
|---|---|---|---|
| 8,175,734 B2 | 5/2012 | Fogel | |
| 9,994,339 B2 * | 6/2018 | Colson | ................... B29C 70/70 |

(Continued)

FOREIGN PATENT DOCUMENTS

| | | |
|---|---|---|
| CN | 106255582 A | 12/2016 |
| CN | 106573434 A | 4/2017 |

(Continued)

OTHER PUBLICATIONS

Mun, Jiwon, et al. "Indirect additive manufacturing based casting of a periodic 3D cellular metal-flow simulation of molten aluminum alloy." Journal of Manufacturing Processes 17 (2015): 28-40. (Year: 2015).*

(Continued)

*Primary Examiner* — John E Johansen
(74) *Attorney, Agent, or Firm* — Michael Dryja

(57) ABSTRACT

Examples of methods for part packing with diffusion auras are described herein. In some examples, a first diffusion aura for a first portion of a part is determined. In some examples, a second diffusion aura for a second portion of the part is determined. In some examples, the part is packed based on the first diffusion aura and the second diffusion aura.

11 Claims, 4 Drawing Sheets

100

Determine a first a first diffusion aura for a first portion of a part — 102

Determine a second diffusion aura for a second portion of the part — 104

Pack the part based on the first diffusion aura and the second diffusion aura — 106

(51) Int. Cl.

| | |
|---|---|
| *B29C 64/386* | (2017.01) |
| *B33Y 50/00* | (2015.01) |
| *G06F 113/10* | (2020.01) |
| *G06F 119/18* | (2020.01) |
| *B22F 10/28* | (2021.01) |
| *B33Y 30/00* | (2015.01) |

(52) U.S. Cl.

CPC ............... *B22F 10/28* (2021.01); *B33Y 30/00* (2014.12); *G06F 2113/10* (2020.01); *G06F 2119/18* (2020.01); *Y02P 10/25* (2015.11); *Y02P 90/02* (2015.11)

(58) Field of Classification Search

CPC .. G06F 2113/10; G06F 2119/18; Y02P 10/25; Y02P 90/02

USPC ............................................................ 703/1

See application file for complete search history.

(56) References Cited

U.S. PATENT DOCUMENTS

| | | | |
|---|---|---|---|
| 2004/0193392 A1 | 9/2004 | Williams | |
| 2010/0086721 A1* | 4/2010 | Batchelder ............. | B33Y 30/00 |
| | | | 700/98 |
| 2011/0087350 A1 | 4/2011 | Fogel et al. | |

| | | | |
|---|---|---|---|
| 2015/0096266 A1 | 4/2015 | Divine et al. | |
| 2015/0321427 A1* | 11/2015 | Gunnarsson ....... | G05B 19/4099 |
| | | | 700/98 |
| 2015/0331402 A1 | 11/2015 | Lin | |
| 2016/0039194 A1 | 2/2016 | Cable | |
| 2016/0152358 A1 | 6/2016 | Divine | |
| 2017/0151722 A1* | 6/2017 | Prasad .................. | B29C 64/165 |
| 2017/0253401 A1 | 9/2017 | Bouthillier | |
| 2017/0304944 A1 | 10/2017 | Symeonidis | |
| 2017/0309079 A1 | 10/2017 | Naples | |
| 2017/0341795 A1 | 11/2017 | Colson | |
| 2018/0330029 A1 | 11/2018 | Pedersen et al. | |
| 2019/0291184 A1* | 9/2019 | Buller .................... | B29C 64/20 |

FOREIGN PATENT DOCUMENTS

| | | | | |
|---|---|---|---|---|
| CN | 108875138 A | 11/2018 | | |
| WO | WO-2017200527 A1 * | 11/2017 | ............. | G06T 19/00 |
| WO | WO-2018182589 A1 * | 10/2018 | ........... | B29C 64/153 |

OTHER PUBLICATIONS

Peng, Hao, et al. "Fast prediction of thermal distortion in metal powder bed fusion additive manufacturing: Part 1, a thermal circuit network model." Additive Manufacturing 22 (2018): 852-868. (Year: 2018).*

* cited by examiner

100

102

Determine a first a first diffusion aura for a first portion of a part

104

Determine a second diffusion aura for a second portion of the part

106

Pack the part based on the first diffusion aura and the second diffusion aura

Figure 3:
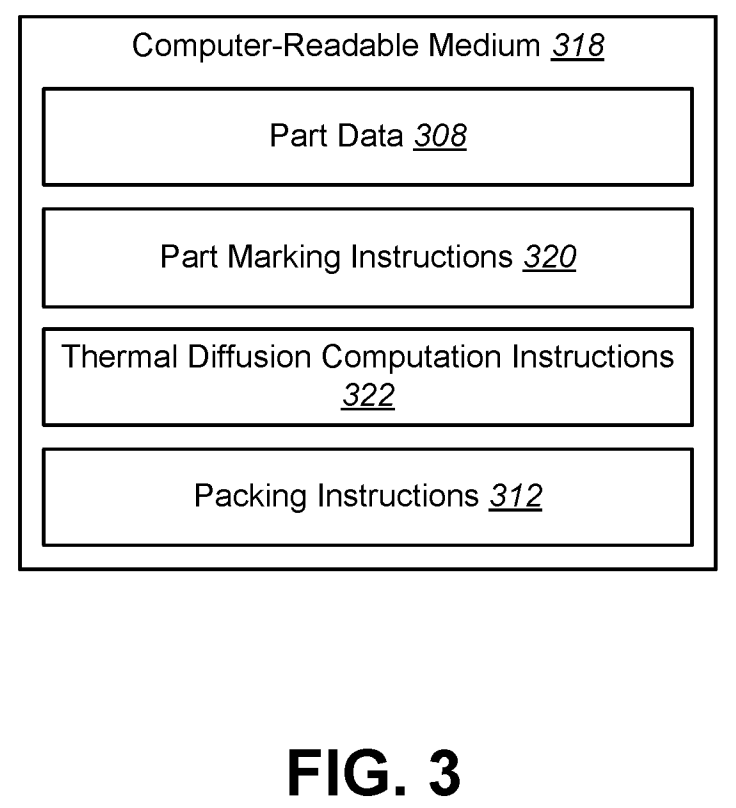

Computer-Readable Medium _318_

Part Data _308_

Part Marking Instructions _320_

Thermal Diffusion Computation Instructions _322_

Packing Instructions _312_

PART PACKING WITH DIFFUSION AURAS

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike some machining processes that often remove material to create the final part. In some additive manufacturing techniques, the build material may be cured or fused.

BRIEF DESCRIPTION OF THE DRAWINGS

FIG. 3 is a block diagram illustrating an example of a computer-readable medium for performing part packing with diffusion auras.

DETAILED DESCRIPTION

Figure 1:
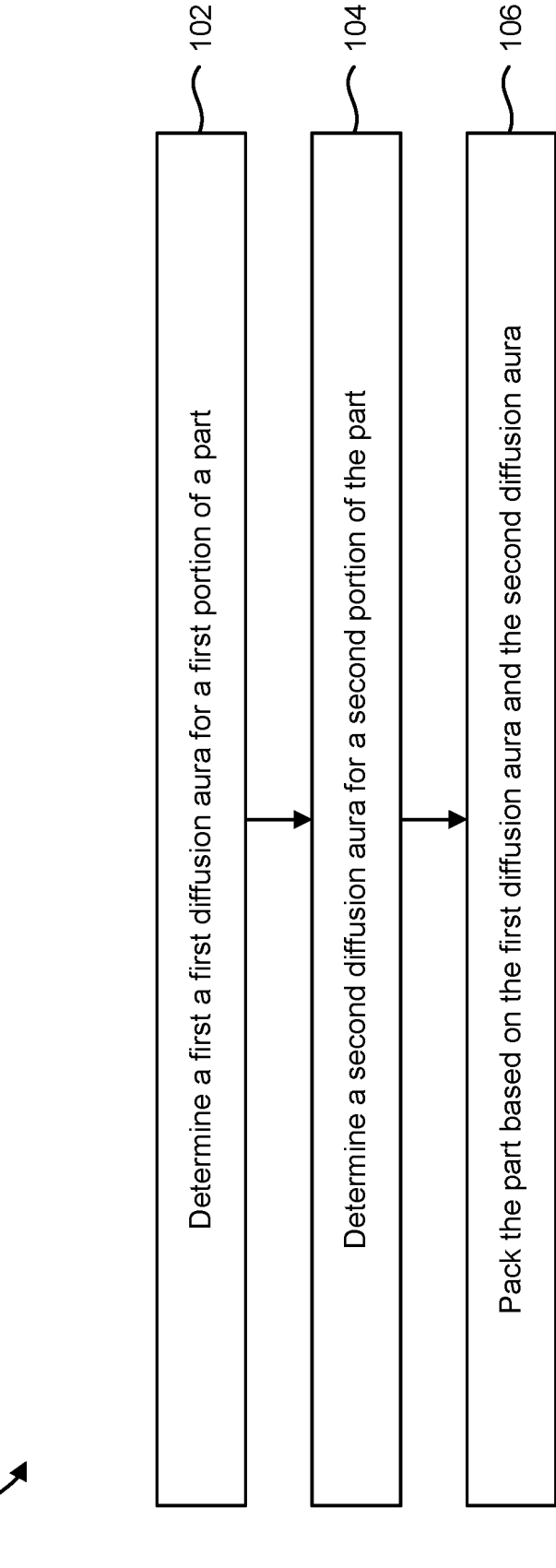
FIG. 1 is a flow diagram illustrating an example of a method for part packing with diffusion auras.

Additive manufacturing may be used to manufacture three-dimensional (3D) parts. A part is an object that may be formed through additive manufacturing. 3D printing is an example of additive manufacturing. Performing additive manufacturing relies on a packing. A packing is information that specifies an arrangement (e.g., position, location, orientation, placement, etc.) of parts in a build volume. A build volume is a 3D space. A build volume may correspond to a physical space in which additive manufacturing may be performed. It may be beneficial to increase packing density in the build volume to increase production and/or reduce manufacturing costs. It may also be beneficial to tailor the packing for printing and post processing such that the parts placed in the build volume have a target yield. Some examples of the techniques described herein address packing density and yield.

Some parts have surface features where extra protection in manufacturing is beneficial. For example, it may be beneficial to use larger inter-part spacing (e.g., thicker powder padding) for fine surface features. This may provide protection against, for example, de-caking.

In some techniques, inter-part spacing may be specified as a constant distance for a build volume, regardless of part size, geometry, and/or complexity (e.g., surface-to-volume ratio). For example, if a build includes a part with fine features, a larger than baseline inter-part spacing may be specified when packing the build. Part packing density may be very sensitive (super-linear) to inter-part spacing. It may be beneficial to reduce or minimize Inter-part spacing.

Some of the techniques described herein enable generation of a volume, which may be referred to as an aura. In some examples, an aura for a given part may provide additional powder padding for fine features of the part but not elsewhere for the part, such that some features may be protected while improving packing density. A fine feature is a feature of a part at the part surface or near the part surface for which extra protection from the manufacturing (e.g., printing) process and/or post-process would be beneficial.

For example, a fine feature may utilize extra protection to avoid degrading the fine feature in manufacturing (e.g., printing). In some examples, fine features may be features with a dimension or dimensions that is or are a threshold value (e.g., 800 microns or 1.5 millimeters) or smaller. In some examples, a fine feature may be additionally or alternatively indicated by another criterion or criteria (e.g., structure type, user-specified region, target region for protection, etc.). For example, a fine feature may be conductive circuitry on or near the surface of a part, or an antenna printed on the surface of a part. For instance, some features may not necessarily be "small" (e.g., with a dimension smaller than or equal to the threshold value), but may be considered fine features to be provided with additional protection. In some examples, other features (e.g., non-fine features) may be features that are not fine features (e.g., features with a dimension or dimensions larger than the threshold value and/or features not targeted for protection).

In some examples, inter-part spacing for part packing may be determined by creating an aura for a given part. In some examples, the aura may depend on the occurrence and characteristics (e.g., location, grade) of certain features (e.g., fine features). Additionally or alternatively, the aura may depend on part shape, size, and/or geometrical complexity. In some examples, different parts within the same build may have (e.g., may utilize) different inter-part spacing and/or different locations of the same part can have different inter-part spacing depending on the presence and/or location of features. Some examples of the techniques described herein may allow shape-based parts packing to improve packing density.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a flow diagram illustrating an example of a method 100 for part packing with diffusion auras. The method 100 and/or a method 100 element or elements may be performed by an apparatus (e.g., electronic device). For example, the method 100 may be performed by the apparatus 202 described in connection with FIG. 2.

The apparatus may determine 102 a first diffusion aura for a first portion of a part. A diffusion aura is a volume relative to a part. For example, a diffusion aura may indicate a padding around a part or a spacing (e.g., inter-part spacing) from a part. In some examples, a diffusion aura may define a volume for a part such that during a packing process no other part or parts would be placed to overlap with or intersect the volume. In some examples, the diffusion aura may define a layer of loose powder padded around a part to provide protection for the part. A diffusion aura may correspond to a portion of a part or a whole part. In some examples, a diffusion aura for a whole part may include diffusion auras corresponding to multiple portions of the part. A diffusion aura may vary in size (e.g., thickness) over a part. The first portion is a subset of the part that is targeted for additional protection (e.g., increased padding or inter-part spacing). For example, the first portion may be a portion of the part that includes fine features or that is specified for additional protection.

The apparatus may determine 104 a second diffusion aura for a second portion of a part. The second portion is a subset of the part that is different from the first portion. In some examples, the second portion may be complementary to the first portion. The second portion may not be targeted for additional protection. For example, the second portion may be a portion for baseline padding or inter-part spacing (e.g., no padding or a predetermined amount of padding). As used herein, "baseline" denotes a predetermined or an established amount. For example, the second portion may be a portion of the part that does not include fine features or that is not specified for additional protection. In some examples, the first diffusion aura and the second diffusion aura may be regions of a single diffusion aura. For example, the first diffusion aura may be a region of a diffusion aura corresponding to the first portion of the part and the second diffusion aura may be another region of the diffusion aura corresponding to the second region of the part.

In some examples, the method 100 may include determining the first portion of the part based on a dimension of the part that is smaller than a threshold or thresholds. The threshold or thresholds may be predetermined or determined based on a received input. Examples of the threshold or thresholds include 800 microns and 1.5 millimeters (mm). In some examples, the apparatus may determine the first portion based on part data (e.g., a model file).

In some examples, the part data (e.g., model) includes geometrical information (e.g., non-uniform rational basis spline (NURBS) information, face information, edge information, etc.) and the apparatus may determine the first portion based on the part data. For example, all edges that are smaller than the threshold may be marked as protected edges (e.g., as included in the first portion). All faces that include a protected edge may be marked as protected faces (e.g., as included in the first portion).

In some examples, the part data (e.g., model) is a mesh model (e.g., 3D manufacturing format (3MF) file) and each surface mesh element (e.g., surface triangle) may be evaluated to compute characteristic length. All mesh elements with a characteristic length smaller than the threshold may be marked as protected meshes (e.g., as included in the first portion). In some examples, the apparatus may select a procedure (e.g., geometrical information approach or mesh model approach) for determining the first portion based on a type of information provided and/or received (e.g., geometrical information or mesh model).

In some examples, the method 100 may include marking the first portion of the part with a value. A portion or portions of the part that are marked may be included in the first portion. In some examples, the marking may be a Boolean or binary value. For example, a pixel or voxel of the part may be labeled as included (e.g., "1" or "true") or not included (e.g., "0" or "false") in the first portion.

In some examples, a set of multiple thresholds may be utilized. The thresholds may be predetermined or determined from a received input (e.g., specified by a user input). An example of the set of thresholds may be 800 microns and 1.5 mm. The apparatus may mark different part portions with different values. For example, a portion with a dimension less than 800 microns may be marked with a first value (for highest protection), a portion with a dimension greater than or equal to 800 and less than 1.5 mm may be marked with a second value (for high protection), and/or a portion with a dimension greater than or equal to 1.5 mm may be marked with a third value (for baseline protection).

In some examples of categorical marking, values of different portions may indicate a different protection (e.g., different thickness of loose powder used for protection). In some examples of nominal marking, the marking may include values such as characteristic length of a feature. The characteristic length may be used in a formula to compute the aura (e.g., padding).

In some examples, determining the first portion of the part may be based on an input received from a user interface. For example, the apparatus may present a user interface that depicts the part. The user interface may provide a function to erase a marking of the first portion, to add a marking for the first portion, and/or to select a region of the part. In some examples, determining the first portion may be performed based on the automatic determination by the apparatus (based on the geometrical information), based on the input received from the user interface, or both.

In some examples, the part with the marking is presented through the user interface. This user interface may include a function or functions to mark the part. The function or functions may include an erase function (to remove markings), a marker adding function (to add a marking such as a Boolean value, a categorical value, or a nominal value), and/or a region selection function (to select a region of the part for adding or erasing marking). In some examples, the selection function may provide and/or present a spherical region with an input point as the center with an adjustable radius (based on input). Using the function or functions, the apparatus may mark the part for the first portion and/or may change an automatically generated marking based on received input.

In some examples, the part may be voxelized before, during, and/or after marking. Each voxel may be presented with marking information. The marking information may be presented as with a color or colors, texture or textures, character or characters, hatching, shading, etc. For example, a voxel without a marking may be presented as translucent white, and different values of gray shades may be presented to indicate different values of the marking. This may enable review of the first portion (and/or other portion(s)). Each voxel may be selectable and/or editable with the user interface.

In some examples, determining 102 the first diffusion aura may be based on the marking of the first portion. For example, determining 102 the first diffusion aura and/or determining 104 the second diffusion aura may include translating the marking of the first portion into a thermal domain. The first diffusion aura may be computed based on a thermal diffusion. The thermal diffusion may be a technique to model an aura, and may not represent actual thermal behavior in some examples.

In some examples, the aura may be determined by modeling a negative force as a function of distance. For instance, the impact of the negative force may be reduced with distance. Thermal diffusion may be utilized as the model to simulate this effect in some examples.

In some examples, translating the first portion into a thermal domain may include assigning an initial temperature value to voxels outside of the part. For instance, for voxels outside of the part, an initial temperature value of $T0$ may be assigned. A base temperature value may be assigned to voxels of the part. For instance, for each part voxel, a base temperature $T1$ ($T1>T0$) may be assigned. For example, each part voxel (that is not included in the first portion) with the base temperature may be the second portion of the part. A first portion temperature value may be assigned to each voxel marked as the first portion. For instance, all of the voxels included in the first portion (e.g., fine-feature voxels) may be traversed (e.g., looped over). In some examples, the temperature value ($T2$) for each voxel of the first portion may be based on the marking value. For instance, if the marking is Boolean, then a constant T2 (T2>T1>T0) may be assigned. If the marking is categorical, the temperature value (T2) may be determined based on the marking value, where higher values (e.g., finer features) are assigned higher temperature values (T2). If the marking is nominal, the temperature value (T2) may be computed as a difference (e.g., delta_T) based on the nominal marking such that the difference (delta_T) trends in the opposite direction as the marking where T2 is a summation of T1 and delta_T. For example, the nominal marking may indicate or correspond to a size or characteristic length (e.g., may be smaller for smaller features).

Each part voxel may have an assigned temperature value as a fixed-temperature boundary condition. The apparatus may compute a thermal diffusion based on the temperature value(s) of the first portion. For example, the apparatus may compute a steady-state or a transient thermal diffusion over a pre-determined duration. Accordingly, computing the first diffusion aura may include computing a thermal diffusion of the first portion temperature value.

In some examples, the apparatus may compute the first diffusion aura based on a thermal diffusion. Computing the first aura may include determining an iso-volume with an iso-surface along a boundary temperature of the thermal diffusion. An iso-surface is a surface along a set of voxels with a value or range. For example, an iso-surface may be surface that travels through voxels having a boundary temperature from the thermal diffusion. The boundary temperature is a temperature or range of temperature that establishes the iso-surface. For example, the apparatus may utilize a boundary temperature (e.g., a minimum temperature) (TA) to determine the first aura, where voxels having the boundary temperature include the iso-surface. In some examples, the boundary temperature may be set between T0 and T1. The boundary temperature may be predetermined and/or received (via a user interface and/or another device). An iso-volume is a volume established by the iso-surface. For example, the volume within the iso-surface may be the iso-volume.

The iso-volume may include the part for which the thermal diffusion is computed. For example, all part voxels may be encapsulated because the part voxel temperature may be fixed and at least higher than T1. Thicker loose powder may be included in this iso-volume near fine features as they are greater "heat sources," where the heat (e.g., temperature) penetrates into the loose powder. Because the modeled heat from the first portion of the part may be greater than the modeled heat of the second portion, the second diffusion aura (or a second region of the diffusion aura) may be thinner than the first diffusion aura (or a first region of the diffusion aura). Adjustments may be used to change the aura thickness and distribution among the features, which may be tuned to trade off the risk of feature protection with higher packing density.

The apparatus may pack 106 the part based on the first diffusion aura and the second diffusion aura. For example, the apparatus may utilize a packing procedure to pack 106 the part in a build volume. The packing may be determined such that the first diffusion aura and the second diffusion aura (e.g., regions of a diffusion aura for the part) do not overlap with another part or another diffusion aura. Accordingly, inter-part spacing may be determined based on and/or constrained by the diffusion aura(s).

In some examples, packing the part based on the first diffusion aura and the second diffusion aura may include packing the part in a build volume such that the first diffusion aura and the second diffusion aura do not overlap with another part or another diffusion aura. In some examples, a genetic procedure may be utilized to perform packing. For example, the apparatus may utilize a multi-objective optimization engine using a genetic procedure for part packing. The genetic procedure is a shape-based packing procedure that improves packing density compared to purely bounding box-based approach. The objectives for optimization may include packing density, height (e.g., z-height), and/or features that are printing-process specific (e.g., thermal-aware features such as minimization of re-radiation impacts).

In some examples, auras may be packed based on corresponding voxel representations. During packing, each aura's orientation and placement may be recorded. The part may be oriented and translated to fit into the packing by replacing the thermal aura with the corresponding part. In some examples, the orientation of the aura and/or part alignment may be explicit. The translation of the thermal aura and/or part alignment may rely on a pre-defined fiducial point during aura generation.

It should be noted that some examples of the techniques described herein may be utilized in a variety of additive manufacturing. Some additive manufacturing techniques may be powder-based and driven by powder fusion. Some examples of the approaches described herein may be utilized in powder bed fusion-based additive manufacturing, such as Selective Laser Melting (SLM), Selective Laser Sintering (SLS), Multi-Jet Fusion (MJF), etc.

Figure 2:
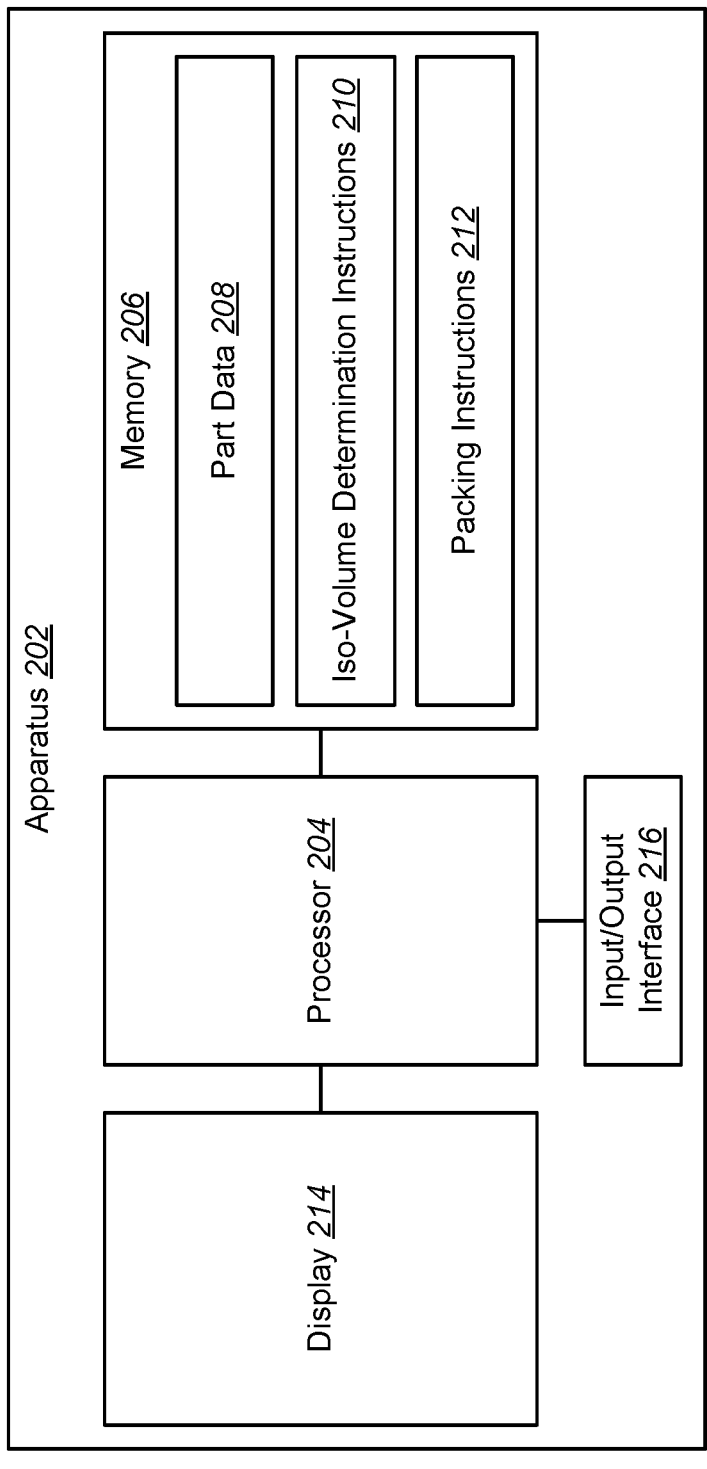
FIG. 2 is a block diagram of an example of an apparatus that may be used in part packing with diffusion auras.

FIG. 2 is a block diagram of an example of an apparatus 202 that may be used in part packing with diffusion auras. The apparatus 202 may be an electronic device, such as a personal computer, a server computer, a printer, a 3D printer, a smartphone, a tablet computer, etc. The apparatus 202 may include and/or may be coupled to a processor 204 and/or a memory 206. In some examples, the apparatus 202 may include a display 214 and/or an input/output interface 216. In some examples, the apparatus 202 may be in communication with (e.g., coupled to, have a communication link with) an additive manufacturing device (e.g., a 3D printing device). Alternatively, the apparatus 202 may be an example of a 3D printing device. The apparatus 202 may include additional components (not shown) and/or some of the components described herein may be removed and/or modified without departing from the scope of this disclosure.

The processor 204 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 206. The processor 204 may fetch, decode, and/or execute instructions (e.g., iso-volume determination instructions 210 and/or packing instructions 212) stored in the memory 206. Additionally or alternatively, the processor 204 may include an electronic circuit or circuits that include electronic components for performing a function or functions of the instructions (e.g., iso-volume determination instructions 210 and/or packing instructions 212). In some examples, the processor 204 may perform one, some, or all of the functions, operations, elements, methods, etc., described in connection with one, some, or all of FIGS. 1-4.

The memory 206 may be any electronic, magnetic, optical, or other physical storage device that contains or stores electronic information (e.g., instructions and/or data). The memory 206 may be, for example, Random Access Memory (RAM), Electrically Erasable Programmable Read-Only Memory (EEPROM), a storage device, an optical disc, and the like. In some examples, the memory 206 may be volatile and/or non-volatile memory, such as Dynamic Random Access Memory (DRAM), EEPROM, magnetoresistive random-access memory (MRAM), phase change RAM (PCRAM), memristor, flash memory, and the like. In some implementations, the memory 206 may be a non-transitory tangible machine-readable storage medium, where the term "non-transitory" does not encompass transitory propagating signals. In some examples, the memory 206 may include multiple devices (e.g., a RAM card and a solid-state drive (SSD)).

In some examples, the apparatus 202 may include an input/output interface 216 through which the processor 204 may communicate with an external device or devices (not shown), for instance, to receive and store information (e.g., part data 208) pertaining to an object or objects to be manufactured (e.g., printed). The input/output interface may include hardware and/or machine-readable instructions to enable the processor 204 to communicate with the external device or devices. The input/output interface may enable a wired or wireless connection to the external device or devices. The input/output interface may further include a network interface card and/or may also include hardware and/or machine-readable instructions to enable the processor 204 to communicate with various input and/or output devices, such as a keyboard, a mouse, a display 214, a touchscreen, a microphone, a controller, another apparatus, electronic device, computing device, etc., through which a user may input instructions into the apparatus 202.

In some examples, the memory 206 may store part data 208. The part data 208 may be obtained (e.g., received) from an external device and/or may be generated on the apparatus 202. For example, the processor 204 may execute instructions (not shown in FIG. 2) to receive the part data 208 from an external device.

The part data 208 may include data indicating a number of parts and shapes (e.g., 3D models, dimensions, etc.) of parts. For example, the part data 208 may indicate a set of parts for packing and/or manufacture.

In some examples, the processor 204 may present a user interface with a part on the display 214. For example, the part may be depicted as a two-dimensional (2D) or 3D model or image.

In some examples, the processor 204 may receive an input indicating a first portion of the part. This may be accomplished as described in connection with FIG. 1. For example, the processor 204 may receive an input or inputs directing the execution of a function or functions (e.g., erase a marking, add a marking, and/or selecting a region of the part). The processor 204 may determine the first region based on the received input. In some examples, the processor 204 may additionally or alternatively automatically determine a first portion (and/or a second portion) of the part based on the part data 208 (e.g., dimensions of the parts, a threshold or thresholds, etc.).

In some examples, the processor 204 may execute iso-volume determination instructions 210 to determine an iso-volume for the part based on the first portion. This may be accomplished as described in connection with FIG. 1. A thickness of the iso-volume (e.g., between an iso-surface and the part) may be different in relation to the first portion and a second portion of the part. The second portion of the part may be complementary to the first portion of the part. For example, the thickness of the iso-volume around the second portion of the part may be thinner that the thickness of the iso-volume around the first portion of the part.

In some examples, the processor 204 may execute the packing instructions 212 to pack the part based on the iso-volume. For example, the processor 204 may perform a search for packings for the part in a build volume. In some examples, the packing instructions 212 may include a genetic procedure to pack the part as described in connection with FIG. 1. In some examples, the packing instructions 212 may be executed to perform voxel-based packing. In some examples, the packing instructions 212 may be executed to utilize the iso-volume (or diffusion aura) representation to perform mesh-based packing.

FIG. 3 is a block diagram illustrating an example of a computer-readable medium 318 for performing part packing with diffusion auras. The computer-readable medium is a non-transitory, tangible computer-readable medium 318. The computer-readable medium 318 may be, for example, RAM, EEPROM, a storage device, an optical disc, and the like. In some examples, the computer-readable medium 318 may be volatile and/or non-volatile memory, such as DRAM, EEPROM, MRAM, PCRAM, memristor, flash memory, and the like. In some implementations, the memory 206 described in connection with FIG. 2 may be an example of the computer-readable medium 318 described in connection with FIG. 3.

The computer-readable medium 318 may include code (e.g., data and/or instructions). For example, the computer-readable medium 318 may include part data 308, part marking instructions 320, thermal diffusion computation instructions 322, and/or packing instructions 312.

The part data 308 may include information indicating parts. For example, the part data 308 may indicate geometrical information (e.g., NURBS data, face data, edge data, etc.) and/or mesh model information.

In some examples, the part marking instructions 320 are code to cause a processor to mark a first portion of a part. This may be accomplished as described in connection with FIG. 1. For example, the processor may execute the part marking instructions 320 to mark the first portion based on part dimensions and a threshold or thresholds. For instance, the part marking instructions 320 may include code to cause the processor to determine the first portion based on edge dimensions of the part. Additionally or alternatively, the processor may execute the part marking instructions 320 to mark the first portion based on received input.

In some examples, the thermal diffusion computation instructions 322 are code to cause the processor to compute a thermal diffusion of the part based on the marked first portion. This may be accomplished as described in connection with FIG. 1. For example, the processor may execute the thermal diffusion computation instructions 322 to determine a thermal diffusion of the part with the first portion having a temperature as a boundary condition.

In some examples, the packing instructions 312 are code to cause the processor to pack the part based on the thermal diffusion. This may be accomplished as described in connection with FIG. 1. For example, the processor may execute the packing instructions 312 to pack the part based on an aura determined from the thermal diffusion.

Figure 4:
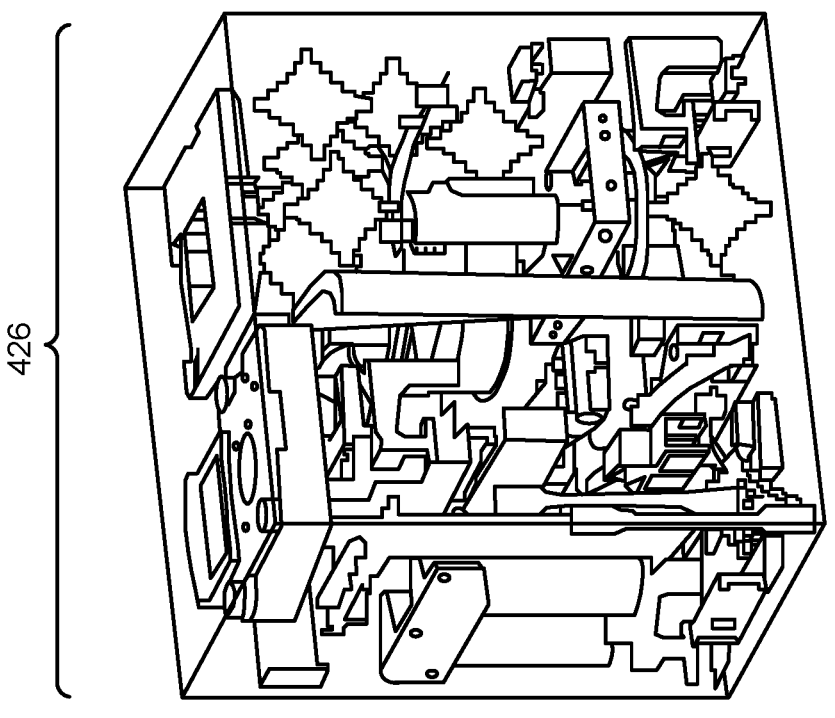
FIG. 4 is a diagram illustrating an example of packed parts with diffusion auras in a build volume and an example of packed parts in the build volume.
Figure 4:
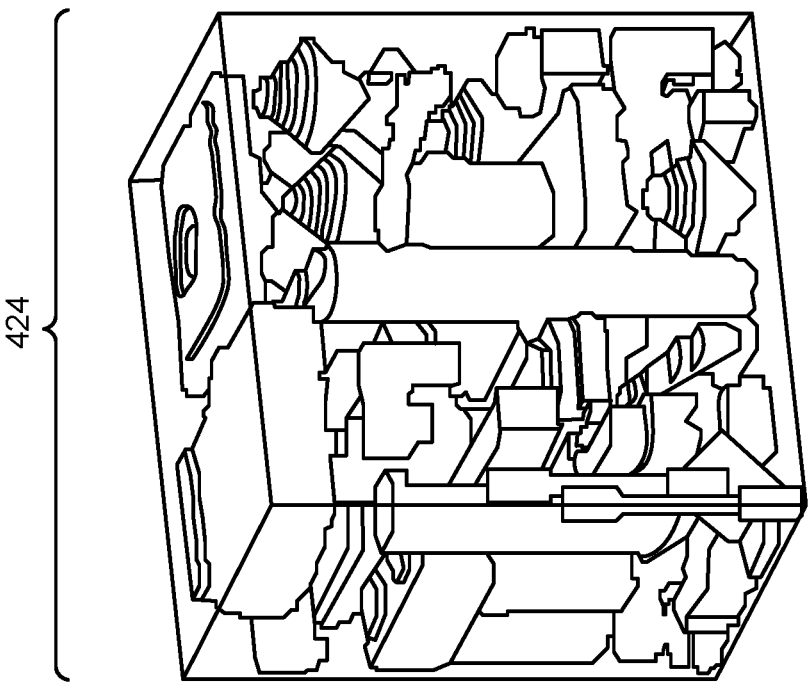

FIG. 4 is a diagram illustrating an example of packed parts with diffusion auras 424 in a build volume and an example of packed parts 426 in the build volume. As can be observed, diffusion auras can be utilized to determine a packing (e.g., inter-part spacing) for a set of parts. In some examples, the apparatus 202 described herein may determine a part packing with the diffusion auras for a set of parts as illustrated in the packed parts with diffusion auras 424 in the build volume. In some examples, the part packing with the diffusion aura(s) (e.g., the packed parts with diffusion auras 424) may be converted to a part packing for manufacture or printing (e.g., the packed parts 426). For example, the diffusion auras may be removed from the parts to determine the final packing (e.g., for transmission and/or manufacture). For example, the apparatus 202 may remove the diffusion auras while keeping the corresponding parts in position. An example of the packed parts 426 with the diffusion auras removed is illustrated.

Some approaches for part packing may include a multi-objective optimization engine using a genetic procedure. A genetic procedure is a procedure (e.g., partial search procedure) to produce a solution to a search problem. A genetic procedure may utilize an objective or objectives to produce a solution. In some examples, a genetic procedure may be utilized as a shape-based packing procedure that can achieve a higher packing density compared to a purely bounding box-based approach. The objectives implemented may include packing density and height (e.g., z-axis height).

It should be noted that while various examples of systems and methods are described herein, the disclosure should not be limited to the examples. Variations of the examples described herein may be implemented within the scope of the disclosure. For example, functions, aspects, or elements of the examples described herein may be omitted or combined.

The invention claimed is:

1. A method comprising:

marking, by a processor coupled to an additive manufacturing device, a first portion of a part with a value;

determining, by the processor, a first diffusion aura for the first portion of the part, by:

assigning an initial temperature value to voxels outside the part;

assigning a base temperature value to voxels of the part;

assigning a first portion temperature value to each voxel of the marked first portion; and computing the first diffusion aura based on a thermal diffusion that is based on one or more than one of the initial temperature value, the base temperature value, and the first portion temperature value;

determining, by the processor, a second diffusion aura for a second portion of the part;

packing, by the processor, the part in a build volume based on the first diffusion aura and the second diffusion aura; and manufacturing, by the processor, the part by communicating instructions to the additive manufacturing device that cause the additive manufacturing device to manufacture the part based on packing of the part.

2. The method of claim 1, further comprising determining the first portion of the part based on a dimension of the part that is smaller than a threshold.

3. The method of claim 1, further comprising determining the first portion of the part based on an input received from a user interface.

4. The method of claim 3, wherein the user interface provides a function to erase a previous marking of the first portion, to perform marking of the first portion with the value, and to select a region of the part.

5. The method of claim 1, wherein computing the first diffusion aura comprises:

computing the thermal diffusion based on at least the first portion temperature value; and determining an iso-volume with an iso-surface along a boundary temperature of the thermal diffusion.

6. The method of claim 1, wherein packing the part in the build volume based on the first diffusion aura and the second diffusion aura comprises packing the part in the build volume such that the first diffusion aura and the second diffusion aura do not overlap with another part or another diffusion aura.

7. The method of claim 1, wherein the second diffusion aura is thinner than the first diffusion aura.

8. A non-transitory tangible computer-readable medium storing executable code that when executed by a processor coupled to an additive manufacturing device, causes the processor to:

mark a first portion of a part with a value;

compute a thermal diffusion of the part based on the marked first portion, by:

assigning an initial temperature value to voxels outside the part;

assigning a base temperature value to voxels of the part; and assigning a first portion temperature value to each voxel of the first portion;

compute an aura based on the thermal diffusion;

pack the part in a build volume based on the aura determined from the thermal diffusion; and manufacture the part by communicating instructions to the additive manufacturing device that cause the additive manufacturing device to manufacture the part based on packing of the part in the build volume.

9. The non-transitory tangible computer-readable medium of claim 8, wherein the first portion is marked based on edge dimensions of the part.

10. A method comprising:

marking, by a processor coupled to an additive manufacturing device, a first portion of a part with a value;

computing, by the processor, a thermal diffusion of the part based on the marked first portion, by:

assigning an initial temperature value to voxels outside of the part;

assigning a base temperature value to voxels of the part; and assigning a first portion temperature value to each voxel of the first portion;

computing, by the processor, an aura based on the thermal diffusion;

packing, by the processor, the part in a build volume based on the aura determined from the thermal diffusion; and causing the additive manufacturing device to manufacture the part based on packing of the part in the build volume.

11. The method of claim 10, wherein the first portion is marked based on edge dimensions of the part.

* * * * *